United States Patent [19]

Sauer

[11] Patent Number: 4,969,240
[45] Date of Patent: Nov. 13, 1990

[54] EXPANDIBLE ELASTIC CLAMPING STRAP FOR END PORTIONS OF HOSES AND THE LIKE

[75] Inventor: Heinz Sauer, Ronneburg, Fed. Rep. of Germany

[73] Assignee: Rasmussen GmbH, Maintal, Fed. Rep. of Germany

[21] Appl. No.: 454,172

[22] Filed: Dec. 21, 1989

[30] Foreign Application Priority Data

Jan. 5, 1989 [DE] Fed. Rep. of Germany ....... 3900190

[51] Int. Cl.$^5$ .............................................. F16L 33/02
[52] U.S. Cl. .................................. 24/20 R; 24/20 TT
[58] Field of Search ............ 24/20 R, 20 CW, 20 EE, 24/20 TT, 20 S

[56] References Cited

U.S. PATENT DOCUMENTS

| 1,804,725 | 5/1931 | Wallcer | 24/20 TT |
| 2,375,541 | 4/1945 | Hartman | 24/20 TT |
| 4,425,681 | 1/1984 | Ilius . | |
| 4,583,268 | 4/1986 | Kloss | 24/20 R |
| 4,773,129 | 9/1988 | Muhr | 24/20 EE X |

FOREIGN PATENT DOCUMENTS 1187079 2/1965 Fed. Rep. of Germany ... 24/20 TT 5319458 5/1978 Japan .

Primary Examiner—James R. Brittain
Attorney, Agent, or Firm—Peter K. Kontler

[57] ABSTRACT

An expandible annular elastic strap has a circumferentially slotted first end portion, a tongue-like second end portion which extends into the slot of the first end portion, and an intermediate portion composed of an outwardly projecting circumferentially extending median section and two marginal sections which flank the median section. The width of each marginal section need not exceed and can be less than half the width of the second end portion, and the three sections of the intermediate portion of the strap extend all the way from the first to the second end portion. The median section of the intermediate portion can be provided with one or more circumferentially extending slots which taper in opposite directions. The median section reduces the area of contact between the external surface of a clamped hose and the intermediate portion of the strap. In addition, the median section increases the moment of resistance of the intermediate portion and thus contributes to more uniform distribution of clamping force all the way around the clamped portion of a hose which is to be maintained in sealing engagement with the external surface of a nipple or pipe.

10 Claims, 1 Drawing Sheet

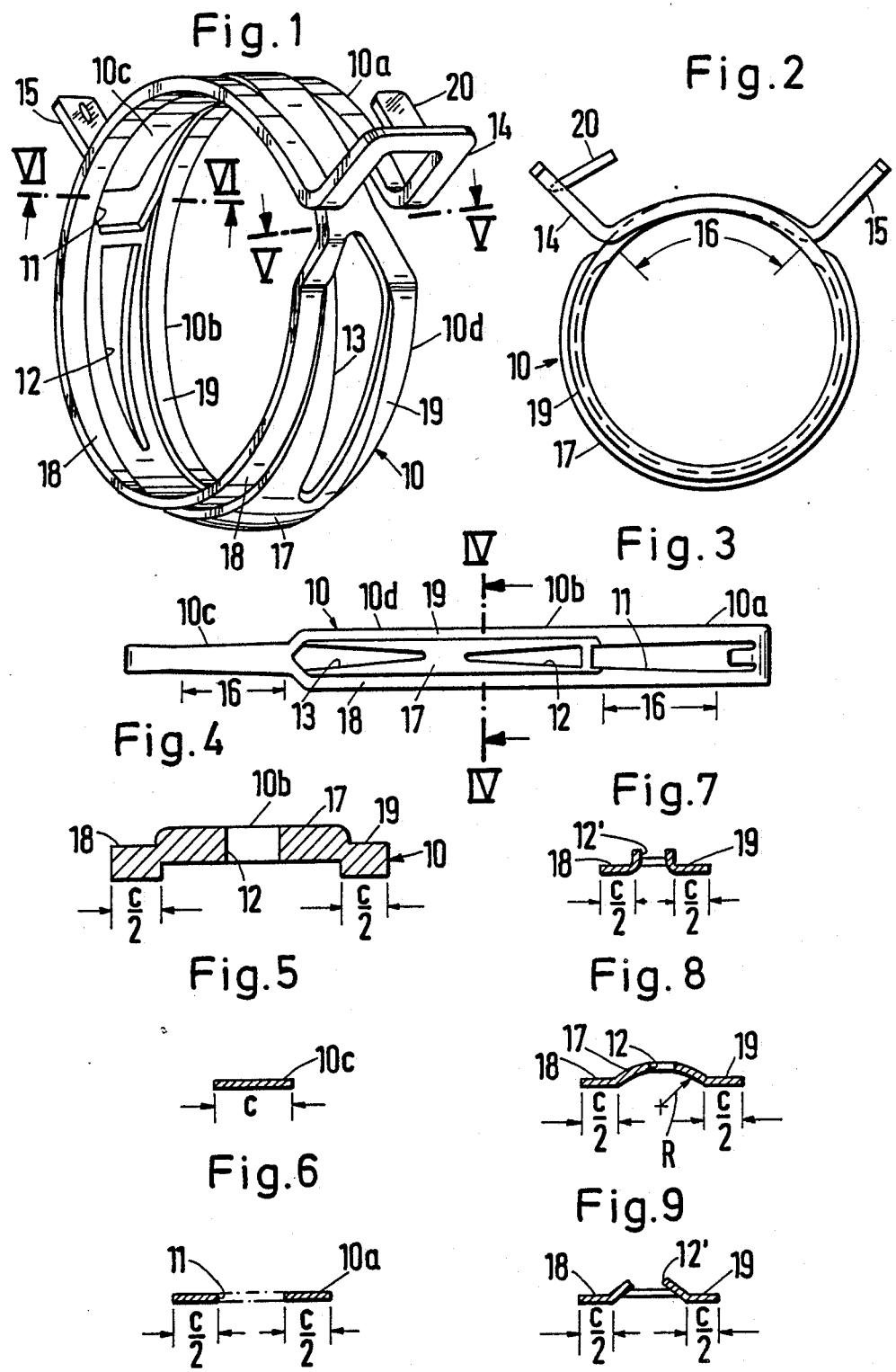

4,969,240

EXPANDIBLE ELASTIC CLAMPING STRAP FOR END PORTIONS OF HOSES AND THE LIKE

BACKGROUND OF THE INVENTION

The invention relates to improvements in expandible elastic clamping straps (also called clamps, hose clamps, clips, spring clips or nipple clasps), especially to improvements in straps which can be used with advantage to sealingly secure the end portions of hoses to pipes, nipples or other tubular bodies.

U.S. Pat. No. 4,425,681 to Ilius discloses a strap or clamp wherein one end portion of an annular steel band extends into a circumferentially extending slot of the other end portion and the intermediate portion of the strap has two circumferentially extending slots which taper in opposite directions. The width of the slot in the one end portion of the strap is substantially constant, the same as the width of the other end portion. One slot in the intermediate portion of the strap tapers in a direction away from the first end portion toward the second end portion, and the other slot of the intermediate portion tapers in the opposite direction. The end portions of the patented strap or clamp are provided with outwardly extending lugs which can be engaged by the jaws of pliers to move toward each other and to thus increase the diameter of the strap. This renders it possible to slip the expanded strap onto the end portion of a hose or to readily disengage the strap from the hose. The strap tends to reduce its diameter and to thus bear against the external surface of the end portion of the hose which is thereby biased against the external surface of a pipe, nipple or another tubular body.

A drawback of the patented strap or clamp is that its bias upon the end portion of the hose is not uniform all the way around. Measurements indicate that the bias of the band upon a hose or another deformable object is rather pronounced in the region where the two end portions are interdigitated (i.e., in the region of the slot in the one end portion) but that the bias is much less pronounced in the region substantially diametrically opposite the two end portions, namely between the slots in the intermediate portion. The sealing action of the strap increases at an unpredictable rate from the region of minimum bias toward the end portions of the strap. The area of contact between the hose and the internal surface of the strap in the region of the interdigitated end portions equals or approximates the area of contact between the hose and the strap in the region diametrically opposite the end portions. Thus, and based on the results of measurements, the force exerted by the strap per unit area of the external surface of the hose in the region diametrically opposite the end portions of the strap is a fraction of the force per unit area of the hose in the region of the end portions of the strap. This is undesirable in many instances, e.g., when the strap is used under the hood of a motor vehicle to secure a hose to a nipple or to another tubular body. In other words, the sealing action of the strap should be uniform, or at least substantially uniform, all the way around the end portion of a hose which is engaged and deformed by the strap.

OBJECTS OF THE INVENTION

An object of the invention is to provide an expandible elastic strap or clamp (hereinafter called strap) which is constructed and configurated in such a way that it is capable of applying uniform or nearly uniform pressure all the way around a tubular object, such as the end portion of a hose which is to be maintained in sealing engagement with the external surface of a nipple, pipe or another tubular body.

Another object of the invention is to provide a strap which can bias the engaged deformable object with a strong force all the way around the engaged object including the region diametrically opposite the end portions of the strap.

A further object of the invention is to provide the strap with a novel and improved intermediate portion.

An additional object of the invention is to provide a strap wherein each and every portion is capable of applying the same or substantially the same force per unit area of the engaged portion of a deformable tubular object.

Still another object of the invention is to provide a strap which is not likely to unduly stress or damage the engaged deformable object during expansion or contraction and which can be mass-produced from readily available metallic or plastic strip or sheet stock.

A further object of the invention is to provide a strap which can be used as a superior substitute for available straps or clips and which can be expanded just as easily as any conventional hose clip or clamp.

An additional object of the invention is to provide a novel and improved method of enhancing the bias of selected portions of an annular strap.

Another object of the invention is to provide a strap wherein the material surrounding its slot or slots is not likely to penetrate into the end portion of a hose or another deformable object during expansion or contraction of the strap.

SUMMARY OF THE INVENTION

The invention resides in the provision of an elastically expandable annular strap which can be made of a flat or substantially flat strip or band of spring steel or an equivalent springy material. The improved strap comprises a first end portion having a circumferentially extending slot, a circumferentially extending second end portion in the slot, and an intermediate portion between the first and second end portions. The intermediate portion includes a radially outwardly projecting circumferentially extending median section and two circumferentially extending marginal sections which flank the median section. When the strap is permitted to contract around the end portion of a hose in order to bias the end portion of the hose against the external surface of a nipple, pipe or another tubular body, the external surface of the end portion of the hose is normally contacted by the inner sides of both end portions and by the inner sides of the marginal sections of the intermediate portion.

The width of each marginal section (in the axial direction of the annular strap) at most equals but is preferably less than half the width of the second end portion. The two end portions jointly extend circumferentially along a first arc (e.g., along an arc of approximately 90°) in unexpanded condition of the strap, and the three sections preferably extend along a second arc which equals or approximates 360° minus the first arc. Thus, the three sections can extend all the way from the innermost region of the first end portion to the innermost region of the second end portion of the strap.

In accordance with one presently preferred embodiment of the improved strap, the marginal sections of the intermediate portion are disposed in a first arcuate plane and the median section is disposed in a second arcuate plane which is parallel to and is located radially outwardly of the first plane. The curvature of the marginal sections in the circumferential direction of the annular strap can equal the curvature of the median section, and the curvature of all three sections in the axial direction of the strap can be zero. The median section of the intermediate portion of such strap has a convex external surface which is substantially parallel to the convex external surfaces of the marginal sections.

Alternatively, the median section of the intermediate portion of the strap can bulge outwardly from the marginal sections toward a central symmetry plane of the strap midway between the the marginal sections.

Irrespective of selected configuration of the median section, the first end portion can be provided with outwardly extending edges which surround its slot. The same holds true if the intermediate portion of the strap is provided with one or more circumferentially extending slots, particularly in the median section, i.e., such slots can be surrounded by outwardly extending edges.

Each end portion of the strap can be provided with an outwardly extending projection. Such projections can be engaged by the jaws of pliers or by another suitable tool to be moved toward each other and to thus expand (i.e., increase the diameter of) the annular strap preparatory to placing of the strap around the end portion of a hose or for the purpose of detaching the strap from the hose.

The width of the slot in the first end portion can decrease in a direction toward the intermediate portion, and the latter can be provided with a second circumferentially extending slot which is adjacent the first end portion and the width of which decreases in a direction toward the second end portion, and with a third circumferentially extending slot which is disposed between the second slot and the second end portion and the width of which increases in a direction from the second slot toward the second end portion. The width of the second end portion can decrease in a direction away from the third slot substantially at the same rate as the width of the slot in the first end portion. The arrangement is preferably such that the second end portion substantially fills the slot of the first end portion in unexpanded condition of the strap. The width of the first end portion (as seen in the axial direction of the annular strap) can equal or approximate the width of the intermediate portion.

The novel features which are considered as characteristic of the invention are set forth in particular in the appended claims. The improved strap itself, however, both as to its construction and the mode of making and utilizing the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a perspective view of an annular strap which embodies one form of the invention and is shown in unexpanded or partly expanded condition;

FIG. 2 is a smaller scale front elevational view of the strap as seen from the right-hand side of FIG. 1;

FIG. 3 is a developed view of the strap;

FIG. 4 is an enlarged sectional view as seen in the direction of arrows from the line IV—IV of FIG. 3;

FIG. 5 is a sectional view of the second end portion of the strap as seen in the direction of arrows from the line V—V of FIG. 1;

FIG. 6 is a sectional view of the first end portion of the strap as seen in the direction of arrows from the line VI—VI of FIG. 1;

FIG. 7 is a smaller-scale sectional view corresponding to that of FIG. 4 but showing a modified intermediate portion;

FIG. 8 is a smaller-scale sectional view similar to that of FIG. 4 but showing a third intermediate portion wherein the median section bulges outwardly from both marginal sections toward a symmetry plane between the sections; and FIG. 9 is a sectional view similar to that of FIG. 7 but showing still another intermediate portion.

DESCRIPTION OF PREFERRED EMBODIMENTS

The expandible elastic annular strap or clamp 10 which is shown in FIGS. 1 to 6 is made of a single piece of springy metallic material, e.g., a hardened metal such as a chromium-vanadium alloy, and serves to clamp the end portion of a hose or another deformable object to the external surface of a nipple, pipe or another tubular body.

The strap 10 comprises a first end portion 10a which is provided with a circumferentially extending elongated slot 11 tapering slightly in a direction toward a second end portion 10c. The latter resembles an elongated tongue and its width preferably decreases in a direction away from the first end portion 10a (i.e., in the same direction as the slot 11) at the same rate, or at nearly the same rate, as the width of the slot 11. When an originally flat blank (see FIG. 3) is converted into an annular strap 10, the end portion 10c extends into and at least substantially fills the slot 11. The free end of the end portion 10a constitutes a substantially radially outwardly bent protuberance or projection 14, and the free end of the end portion 10c constitutes a substantially radially outwardly bent protuberance or projection 15. These projections can be engaged by the jaws of pliers or an analogous tool to be moved toward each other and to thus increase the diameter of the passage which is defined by the annular strap 10. This facilitates the application of the strap 10 around the end portion of a hose or its separation from the hose. A circumferentially extending lug 20 on the projection 14 limits the extent to which the strap 10 can be expanded, i.e., the extent to which the projections 14, 15 can be moved toward each other.

The intermediate portion (10b+10d) of the strap 10 is provided with at least one but preferably two additional slots, namely a second slot 12 adjacent the end portion 10a and a third slot 13 adjacent the end portion 10c. The slots 12, 13 extend circumferentially of the strap 10 and taper in opposite directions, i.e., the width of the slot 12 decreases in a direction from the slot 11 toward the slot 13, and the width of the slot 13 decreases in a direction away from the end portion 10c, i.e., toward the slot 12. The slot 12 is provided in the part 10b and the slot 13 is provided in the part 10d of intermediate portion 10b+10d of the strap 10.

The reference character 16 denotes in FIG. 2 an arc which extends along an angle of approximately 90° and constitutes the region where the end portions 10a, 10c are interdigitated, i.e., where the arcuate tongue-like end portion 10c extends into the complementary slot 11 of the arcuate end portion 10a. As can be seen in FIG. 3, the width of the end portion 10a (as seen in the axial direction of the strap 10) equals or closely approximates the width of the intermediate portion 10b+10d, i.e., the strap 10 resembles a short cylinder of constant or practically constant axial length.

The slot 11 need not taper gradually all the way from the one to the other end, and the same applies for the taper of the slots 12 and 13.

In accordance with a feature of the invention, the intermediate portion 10b+10d of the strap 10 consists of three elongated sections each of which preferably extends along an arc of 360° minus 16, i.e., along an arc of approximately 270° as seen in FIG. 2. These sections include a circumferentially extending median or central section 17 and two circumferentially extending marginal sections 18, 19 which flank the median section. The median section 17 is disposed radially outwardly of the marginal sections 18, 19, and the curvature of all three sections in the circumferential direction of the strap 10 is the same. The curvature of the sections 17 to 19 in the axial direction of the strap 10 is zero (see particularly FIG. 4). As also shown in FIG. 4, the convex outer surface of the median section 17 is a cylindrical surface, the same as the convex outer surfaces of the marginal sections 18, 19. The width c/2 of the marginal sections 18, 19 preferably does not exceed, and can be at least less than, the width c (FIG. 5) of the end portion 10c. This applies at least for that part of the end portion 10c which is adjacent the part 10d of the intermediate portion of the strap 10. FIG. 4 also shows that the longitudinal joints between the median section 17 and the marginal sections 18, 19 extend substantially at right angles to the planes of the marginal sections, i.e., the material of the blank which has been converted into the structure shown in FIG. 3 is simply shifted in a direction at right angles to the general plane of the blank to move the median section 17 into a plane which is parallel with and outwardly adjacent the common plane of the marginal sections 18, 19. This increases the moment of resistance of the intermediate portion 10b+10d. The inner side of the median section 17 which is shown in FIG. 5 is parallel to the inner sides of marginal sections 18, 19. This, too, increases the moment of resistance of the intermediate portion.

The axial length of the strap 10 (i.e., the width of the end portion 10a and of the intermediate portion 10b+10d) can be selected in such a way that the properly mounted strap fits between two external ribs on a pipe, nipple or another tubular body which is surrounded by the clamped end portion of a hose or another deformable tubular object. The mounting of the strap 10 can be carried out in such a way that the aforementioned tool is used to maintain the projections 14, 15 close to each other (i.e., to increase the diameter of the strap) while the thus expanded strap spacedly surrounds a selected portion of a tube or nipple, and the end portion of a hose is then slipped onto the pipe or nipple within the confines of the expanded clamp before the application of force to the projections 14, 15 is terminated to permit automatic contraction of the strap into sealing engagement with the end portion of the hose which is thereby reliably clamped to the pipe or nipple.

The provision of a raised or outwardly extending median section 17 exhibits the important advantage that the area of contact between the external surface of a hose or the like and the intermediate portion 10b+10d of the strap 10 is much smaller than in the absence of such median section. This is important in the region diametrically opposite the arc 16 (actually in the entire region between the two ends of the arc 16) because the aforediscussed measurements indicate that the force which the strap applies to the adjacent portion of the external surface of a hose per unit area of the internal surface of the intermediate portion of the strap is smaller than in the region of the arc 16, i.e., where the end portion 10c is interdigitated with the two longitudinally extending strips of the end portion 10a. Thus, by confining the overall area of contact between the intermediate portion 10b+10d of the strap 10 and the hose to the area of contact between the hose and the internal surfaces of the relatively narrow marginal sections 18, 19 (while the overall force which is applied by the intermediate portion remains unchanged), the force per unit area of contact between the marginal sections 18, 19 and the hose is much higher than if the hose were also contacted by the inner side of the outwardly extended median section 17. This is achieved without the need for a longer or bulkier strap.

In the absence of a raised median portion, the pressure between the external surface of a clamped hose and the internal surface of the strap would increase gradually from the region between the slots 12, 13 toward the ends of the arc 16, and such pressure would assume a maximum value in the region where the inner sides of the end portions 10a, 10c engage the external surface of the hose.

In a conventional strap, the assumed purpose of the slots 12, 13 (the width of which increases in directions toward the respective end portions of the strap) is to reduce the area of contact between the internal surface of the intermediate portion and the external surface of the hose from the region between these slots toward the adjacent end portions of the strap. This should result in an increase of pressure per unit area of contact between the intermediate portion of the strap and the hose in the same direction, i.e., toward the respective end portions of the strap, in spite of the fact that the moment of resistance (this moment determines the ability of the strap to withstand bending, i.e., to exhibit a hard spring characteristic) decreases in directions from the narrower ends of the slots 12, 13 toward the respective end portions of the strap. All in all, and as already discussed above, the pressure which a conventional strap applies to the end portion of a clamped hose varies at an unpredictable rate from a maximum value in the region of the end portions toward the region between the slots in the intermediate portion of the conventional strap. Such lack of uniformity of pressure which is applied against the external surface of the hose entails a lack of uniformity of pressure between the internal surface of the clamped hose and the external surface of a pipe or nipple, particularly in the region diametrically opposite the end portions of the applied conventional strap.

Since the intermediate portion of the improved strap 10 is provided with the median section 17 which is spaced apart from the external surface of a clamped hose when the strap is put to use, the external surface of the hose is engaged only by the inner sides of the end portions 10a, 10c and by the inner sides of the marginal sections 18, 19. Consequently, the pressure per unit area of contact between the intermediate portion 10b+10d and the hose is much higher than when utilizing a conventional strap. Moreover, the moment of resistance (and hence the spring force) is increased as a result of shifting of the median section outwardly and away from the common plane of the marginal sections 18 and 19. Such median section reinforces or stiffens the entire intermediate portion of the strap 10. The result is that the pressure upon a clamped hose in the region of the end portions 10a, 10c is not substantially higher than in the region of the marginal sections 18 and 19, i.e., the pressure upon the clamped hose is much more uniform all the way around the circumference of the hose.

Another important advantage of the improved strap 10 is that the material of a clamped hose is not likely to penetrate into the slots 12, 13 even when the hose is heated (e.g., by the fluid which flows through it). The material of the heated hose might penetrate into the recess which is adjacent the inner side of the median section 17 but such material is quite unlikely to fill the recess and to actually enter the slot 12 and/or 13. It has been found that the material of a heated hose is not even likely to come in actual contact with the inner side of the median section 17. An advantage of the absence of penetration of the material of the hose into the slot 12 and/or 13 is that the hose cannot interfere with expansion or contraction of the strap 10, especially with contraction of the strap.

FIG. 3 shows that the relatively short zone of transition from the end portion 10c into the adjacent part 10d of the intermediate portion 10b+10d is rather gradual, i.e., those edge faces of the part 10d which confront the end portion 10c slope outwardly in a direction away from the end portion 10c. In certain heretofore known straps, the intermediate portion has two shoulders which extend at right angles to the longitudinal direction of the strap (reference may be had, for example, to FIG. 4 in published Japanese patent application No. 53-19458); such shoulders are likely to penetrate into and to damage a hose during contraction of the strap.

The configuration of the edge face bounding the slot 13 adjacent the end portion 10c is also selected in such a way that this edge face is not likely to damage the hose during contraction of the strap 10, i.e., the two halves of such edge face slope gradually from the adjacent ends of the marginal sections 18, 19 toward the center of the adjacent widest part of the end portion 10c. Moreover, the just described configuration of sloping webs which connect the ends of the marginal sections 18, 19 with the end portion 10c ensures that the area of contact between a clamped hose and this portion of the strap 10 is substantially the same as the area of contact between the hose and the marginal sections 18, 19 (per unit length of these marginal sections).

The intermediate portion 10b+10d of the strap 10 need not be provided with a plurality of discrete slots. For example, the narrow end portions of the slots 12, 13 can communicate with each other so that the median section 17 is then provided with a single substantially hourglass-shaped slot extending all the way, or substantially all the way, between the slot 11 and the end portion 10c.

FIG. 7 shows that the edges which bound the slot 12' can extend outwardly and away from the inner sides of the marginal sections 18, 19 to further reduce the likelihood of damage to a confined hose during contraction of the strap. The edges bounding the other slot or slots (corresponding to the slots 11, 13 of FIG. 3) can be configured in the same way as shown in FIG. 7. The edges bounding the slot 12' and the edges bounding the other slot or slots can extend substantially at right angles to the marginal sections 18 and 19.

FIG. 8 shows a modified intermediate portion wherein the median section 17 bulges outwardly from the marginal sections 18, 19 toward a central symmetry plane which is located midway between the marginal sections. This even further reduces the likelihood of penetration of the material of a clamped and possibly heated hose into the slot 12 and/or into the other slot or slots in the intermediate portion. It will be seen that the curvature of the marginal sections 18, 19 in the axial direction of the strap embodying the structure of FIG. 8 is zero but the curvature of the median section 17 varies gradually as indicated by the radius of curvature R. The transitions between the median section 17 of FIG. 8 and the marginal sections 18, 19 are more gradual than in the embodiment of FIGS. 1–6 (see particularly FIG. 4).

The intermediate portion which is shown in FIG. 9 constitutes a modification of the structure of FIG. 7. Thus, the edges bounding the slot 12' make oblique angles with the respective marginal sections 18 and 19. The edges bounding the other slot or slots in the intermediate portion embodying the structure of FIG. 9 can be inclined in the same way. The same holds true for the edges bounding the slot in the end portion 10a. The inclination of the edges which are shown in FIG. 9 with reference to the common plane of the marginal sections 18, 19 can be in the range of 30 to 60°.

FIGS. 7 to 9 show that the width of the marginal portions 18, 19 (as seen in the axial direction of the respective straps) is less than the width of the median section 17, preferably not more than half the maximum width of the tongue-shaped end portion 10c of the respective strap. The moment of resistance of the intermediate portions which are shown in FIGS. 7 and 9 is somewhat greater than the moment of resistance of the intermediate portion 10b+10d of the strap 10 of FIGS. 1 to 6; this is due to the provision of outwardly extending edges bounding the slot 12' and/or the other slot or slots in the respective intermediate portion.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An elastically expandable annular strap including a first end portion having a circumferentially extending first slot; a circumferentially extending second end portion in said first slot, said end portions jointly extending circumferentially along a first arc in unexpanded condition of the strap; and an intermediate portion between said end portions, said intermediate portion including a radially outwardly projecting circumferentially extending median section having at least one circumferentially extending second slot and two circumferentially extending marginal sections flanking said median section, said sections extending along a second arc and the combined length of said arcs being equal to or approximating 360°, said second end portion having a first width and each of said marginal sections having a second width which at most equals one-half of said first width.

2. The strap of claim 1, wherein said marginal sections are disposed in a first arcuate plane and said median section is disposed in a second arcuate plane which is substantially parallel to said first plane.

3. The strap of claim 2, wherein the curvature of said median section in the circumferential direction of the strap matches the curvature of said marginal sections and the curvature of said sections in the axial direction of the strap equals or approximates zero.

4. The strap of claim 2, wherein said median section has a first convex external surface and said marginal sections have second convex external surfaces substantially parallel to said first surface.

5. The strap of claim 1, wherein said first end portion has substantially outwardly extending edges surrounding said slot.

6. The strap of claim 1, wherein said median section bulges outwardly from said marginal sections toward a plane midway between said marginal sections.

7. The strap of claim 1, wherein each of said end portions has an outwardly extending projection and the width of said first slot decreases in a direction toward said intermediate portion, said at least one second slot being adjacent said first slot and having a width which decreases in a direction toward said second end portion, and said intermediate portion further having a third circumferentially extending slot between said at least one second slot and said second end portion, the width of said third slot increasing from said at least one second slot toward said second end portion.

8. The strap of claim 7, wherein the width of said second end portion decreases in a direction away from said third slot substantially at the same rate as the width of said first slot.

9. The strap of claim, 8, wherein said second end portion substantially fills said first slot in unexpanded condition of the strap.

10. The strap of claim 9, wherein the width of said first end portion in the axial direction of the strap equals or approximates the width of said intermediate portion.

* * * * *